US009850168B2

(12) United States Patent
Gartner et al.

(10) Patent No.: US 9,850,168 B2
(45) Date of Patent: Dec. 26, 2017

(54) BELITE SULFOALUMINATE BINDER

(71) Applicant: LAFARGE, Paris (FR)

(72) Inventors: Ellis Gartner, Lyons (FR); Vincent Morin, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 15/128,621

(22) PCT Filed: Mar. 24, 2015

(86) PCT No.: PCT/FR2015/050739
§ 371 (c)(1),
(2) Date: Sep. 23, 2016

(87) PCT Pub. No.: WO2015/145060
PCT Pub. Date: Oct. 1, 2015

(65) Prior Publication Data
US 2017/0107150 A1 Apr. 20, 2017

(30) Foreign Application Priority Data

Mar. 25, 2014 (FR) ..................... 14 52535

(51) Int. Cl.
*C04B 28/06* (2006.01)
*C04B 40/00* (2006.01)
(52) U.S. Cl.
CPC ........ *C04B 28/065* (2013.01); *C04B 40/0032* (2013.01)

(58) Field of Classification Search
CPC ..................... C04B 40/0032; C04B 28/065
See application file for complete search history.

(56) References Cited

U.S. PATENT DOCUMENTS

2012/0145045 A1* 6/2012 Walenta ................ C04B 7/323
106/708

FOREIGN PATENT DOCUMENTS

| EP | 0 736 489 A1 | 10/1996 |
|---|---|---|
| FR | 2 941 449 A1 | 7/2010 |
| WO | WO 2006/018569 A2 | 2/2006 |
| WO | WO 2006/032785 A2 | 3/2006 |
| WO | WO 2006/032786 A2 | 3/2006 |
| WO | WO 2010/070215 A1 * | 6/2010 |

OTHER PUBLICATIONS

Preliminary Search Report as issued in French Patent Application No. 1452535, dated Dec. 3, 2014.
International Search Report as issued in International Patent Application No. PCT/FR2015/050739, dated Jul. 14, 2015.

* cited by examiner

*Primary Examiner* — Anthony J Green
(74) *Attorney, Agent, or Firm* — Pillsbury Winthrop Shaw Pittman LLP

(57) ABSTRACT

A hydraulic binder includes a belite sulfoaluminate clinker and silica having a BET specific surface area in nitrogen of at least 50 m$^2$/g, the quantity of silica being lower than or equal to 5%, the percentage being expressed as a mass percentage in relation to the mass of the binder.

9 Claims, No Drawings

BELITE SULFOALUMINATE BINDER

CROSS-REFERENCE TO RELATED APPLICATIONS

This application is the U.S. National Stage of International Application Serial No. PCT/FR2015/050739, filed Mar. 24, 2015, which in turn claims priority to French Application No. 1452535, filed Mar. 25, 2014. The contents of all of these applications are incorporated herein by reference in their entirety.

The present invention relates to a hydraulic binder comprising a belitic sulfoaluminous clinker, for example a belite-calcium-sulfoaluminate-ferrite (BCSAF) clinker.

Belitic sulfoaluminous clinkers are clinkers having a low alite content, in particular an alite content of less than or equal to 5% by mass, or not having any alite. Alite is one of the "mineralogical phases" (called "phases" in the continuation of the description) of known clinkers of the Portland type. Alite comprises tricalcium silicate $Ca_3SiO_5$ (which may also be symbolized as $C_3S$ or $3(CaO).(SiO_2)$ as explained hereafter).

The method for manufacturing belitic sulfoaluminous clinkers is such that these clinkers have the advantage of significantly reducing $CO_2$ emissions as compared with the manufacturing of known clinkers of the Portland type.

Clinkers and hydraulic binders comprising calcium sulfoaluminate and belite are known. The acquisition of the mechanical strengths, notably beyond 1 day after mixing, depends on the hydration kinetics of the phases present in the clinker or the hydraulic binder, notably on the belite phase. It is however difficult to improve the acquisition of the mechanical strengths, notably beyond 1 day after mixing, for clinkers or hydraulic binders comprising a belite phase. Indeed, the curing accelerators which operate with a clinker or a hydraulic binder in majority comprising an alite phase, do not generally operate with a clinker or a hydraulic binder in majority comprising a belite phase. The properties of clinkers or hydraulic binders comprising calcium sulfoaluminate and in majority a belite phase are affected by the main phases and the additional minor phases which are present in the clinker or the binder, as well as by their respective amounts. The properties of these clinkers or binders are also affected by the presence of secondary elements in the clinker or the binder and their respective amounts. The interaction between these different factors makes it very difficult to predict the properties of a clinker or of a binder simply by knowing its chemical composition, the phases which are present and the respective amounts of these phases. The facility for manufacturing a clinker, the facility of milling a clinker in order to obtain a hydraulic binder and the different chemical and mechanical properties of a hydraulic composition comprising the binder may all be affected.

The chemical formulae in the field of hydraulic binders are often expressed as sums of oxides which they contain: thus, tricalcium silicate $Ca_3SiO_5$, may also be written as $3CaO.SiO_2$. It is understood that does not mean that the oxides have a specific existence in the hydraulic binder.

The formulae of the oxides commonly encountered in the domain of hydraulic binders are also abbreviated with a single letter, as follows:
C represents CaO,
A represents $Al_2O_3$,
F represents $Fe_2O_3$,
S represents $SiO_2$,
$ represents $SO_3$,
M represents MgO, and
T represents $TiO_2$.

These formulae of oxides are used in a known way by one skilled in the art in the field of building materials, for representing the elementary composition of a hydraulic binder, since all the relevant elements are generally present in a combination with oxygen in the proportions given herein before by the formulae of these oxides. Nevertheless, it is understood that this does not mean that the oxides necessarily have a specific existence in the hydraulic binder.

A problem of hydraulic binders and compositions comprising a belitic sulfoaluminous clinker is the acquisition of satisfactory mechanical compressional strengths beyond 1 day at 20° C.

There exist solutions for improving the acquisition of the mechanical compressional strength beyond 1 day at 20° C. for Portland clinkers, but, as explained herein before, belitic sulfoaluminous clinker has a different chemistry from Portland clinker, and it is not possible to predict whether an effective solution with a Portland clinker will operate with a belitic sulfoaluminous clinker. For example, it is known that calcium chloride improves the kinetics for acquiring the mechanical strengths of a Portland clinker, but decreases the kinetics for acquiring the mechanical strengths of a belitic sulfoaluminous clinker.

On the other hand, there exist solutions for improving the acquisition of mechanical compressional strengths beyond 1 day at 20° C. of a belitic sulfoaluminous clinker, but most of these solutions is based on organic adjuvants, which often have undesirable secondary effects. For example, it is known that citric acid improves the mechanical compressional strengths 28 days after mixing, but decreases the mechanical compressional strengths 1 day after mixing.

In order to fit the requirements of the users, it has become necessary to find a means for improving the kinetics for acquiring the mechanical compressional strengths beyond 1 day at 20° C. of a belitic sulfoaluminous clinker, while avoiding the undesirable secondary effects of known solutions.

Also the problem which the invention intends to solve is to provide a means for improving the kinetics for acquisition of the mechanical compressional strengths beyond 1 day, in particular around 20° C., of a belitic sulfoaluminous clinker.

Unexpectedly, the inventors showed that it is possible to use a particular silica for improving the kinetics for acquiring mechanical compressional strengths beyond 1 day, preferably from 7 days onwards, more preferentially from 14 days after mixing, in particular around 20° C., of hydraulic binders comprising a belitic sulfoaluminous clinker.

The present invention relates to a hydraulic binder comprising a belitic sulfoaluminous clinker and silica having a BET specific surface area under nitrogen of at least 50 $m^2/g$, the amount of silica being less than or equal to 5%, a percentage expressed by mass of $SiO_2$ based on the binder mass.

Preferably, the BET specific surface area of the silica used according to the present invention is greater than or equal to 60 $m^2/g$ under nitrogen.

Preferably, the silica used according to present invention is hydrophilic.

Preferably, the amount of silica used according to present invention is from 0.1 to 5%, more preferentially from 0.1 to less than 5%, still more preferentially from 0.1 to 4%, in particular from 0.5 to 3%, expressed in dry mass based on the binder mass. The binder comprises the clinker, optionally calcium sulfate and optionally at least one mineral addition.

The silica used according to present invention preferably comprises at least 80% by mass of $SiO_2$.

The silica used according to present invention is preferably a silica precipitated into a gas or liquid phase, for example in an aqueous phase.

The silica used according to present invention may be prepared by any known method. For example, the silica used according to present invention may be prepared by neutralizing an alkaline silicate solution with an acid (for example hydrochloric acid), and then by filtration. The silica may also be prepared by hydrolysis of silicon alkoxide in water or in a vapor phase. The silica may also be prepared by reaction between a silicon chloride or fluoride and steam or dioxygen. Generally, the silica precipitated in a gas phase is finer.

Preferably, the hydraulic binder according to present invention does not comprise any aluminium compound selected from among aluminium sulfate, basic aluminium sulfates, alums and mixtures thereof.

The belitic sulfoaluminous clinker used according to present invention generally comprises up to 80%, preferably up to 60%, more preferentially up to 50% by mass of calcium sulfoaluminate. It preferably comprises at least 10%, more preferentially at least 20% by mass of calcium sulfoaluminate. Calcium sulfoaluminate also known under the name of ye'elimite, is of general formula $C_4A_3\$$.

Belitic sulfoaluminous clinker also comprises belite. Belite has the general formula $C_2S$. The minimum amount of belite is generally of at least 15%, preferably at least 20%, more preferentially at least 30% by mass. The maximum amount of belite is preferably less than 80%, more preferentially less than 70%, even more preferentially less than 65% by mass. In this case, the sulfoaluminous clinker is a belitic sulfoaluminous clinker.

Preferably, the belite is partly or totally crystallized in the $\alpha'$ form. More preferentially, at least 50%, for example at least 80%, particularly from 85 to 100% by mass of belite is crystallized in the $\alpha'$ form.

The belitic sulfoaluminous clinker also preferably comprises calcium aluminoferrite. Calcium aluminoferrite has the general formula $C_2A_xF_{(1-x)}$, wherein x is from 0.2 to 0.8. The amount of calcium aluminoferrite is preferably of at least 5%, more preferentially of at least 10%, still more preferentially of at least 15% by mass.

In the case when the belitic sulfoaluminous clinker comprises calcium sulfoaluminate, belite and calcium aluminoferrite, this is a clinker of the belite-calcium-sulfoaluminate-ferrite (BCSAF) type.

Preferably, the clinker used according to present invention is a BCSAF clinker.

The belitic sulfoaluminous clinker preferably comprises, by mass based on the total mass of belitic sulfoaluminous clinker:
from 5 to 30% of calcium aluminoferrite phase;
from 10 to 35% of calcium sulfoaluminate phase; and
from 40 to 75% of belite phase.

Preferably, the belitic sulfoaluminous clinker comprises at most 5%, more preferentially less than 1% by mass of an alite phase.

The belitic sulfoaluminous clinker may also comprise from 0.01 to 10% of at least one of the minor phases selected from among: calcium sulfate, alkaline metal sulfate, perovskite, calcium mono-aluminate (for example tricalcium aluminate), gehlenite, free lime, periclase, $C_{11}S_4B$, mayenite, ferroperovskite, spinelle, ternesite and/or a glassy phase.

The total of the percentages of calcium aluminoferrite, calcium sulfoaluminate, belite and minor phases is preferably greater than or equal to about 97%, more preferentially greater than or equal to about 98%, still more preferentially greater than or equal to about 99%, for example about 100%.

According to an alternative, the belitic sulfoaluminous clinker may comprise:
from 10 to 25% of calcium aluminoferrite phase;
from 15 to 30% of calcium sulfoaluminate phase;
from 45 to 70% of belite phase; and
from 0.01 to 5% of at least one of the minor phases.

More preferentially, the sulfoaluminous clinker comprises:
from 15 to 25% of calcium aluminoferrite phase;
from 20 to 30% of calcium sulfoaluminate phase;
from 45 to 60% of belite phase; and
from 0.01 to 5% of at least one of the minor phases.

Pure belite has the general formula $2(CaO).(SiO_2)$, (i.e. $C_2S$); pure calcium sulfoaluminate has the general formula $4(CaO).3(Al_2O_3).(SO_3)$, (i.e. $C_4A_3\$$). Belite, calcium sulfoaluminate, ferroperovskite, ternesite and the other additional phases of the general formulae given herein before may also comprise substitution elements.

Each phase mentioned in the clinker used according to present invention is crystalline (except for the glassy phase) and has its own x-ray diffraction spectrum. The amount of phases in the clinker is generally determined by x-ray diffraction by using an analysis of the Rietveld type. The glassy phase is not crystalline and therefore does not have any characteristic x-ray diffraction profile. The amount of glassy phase is generally determined from the complete x-ray diffraction spectrum of the clinker.

The belitic sulfoaluminous clinker used according to present invention may comprise the $C_2AS$ phase (generally less than 5%), the CA phase (generally less than 10%), the $C_3FT$ phase (generally less than 3%) and/or the $C_{12}A_7$ phase (generally less than 3%).

The clinker preferably comprises from 5 to 13%, more preferentially from 9 to 13%, of iron expressed as $Fe_2O_3$.

The belitic sulfoaluminous clinker used according to the invention generally comprises from 2 to 10% of sulfur expressed as $SO_3$. Preferably the sulfoaluminous clinker does not comprise any $C_3S$ phase.

The clinker according to one alternative comprises from 0.2 to 3%, more preferentially from 0.2 to 2%, for example from 1 to 2% of boron expressed as boric anhydride.

The clinker used according to present invention may comprise, in the main phases and/or in the other phases, one or several of the secondary elements selected from among sodium, potassium, fluorine, chlorine, magnesium, titanium, manganese, strontium, zirconium, phosphorus and mixtures thereof. The total amount of secondary elements in the sulfoaluminous clinker is preferably less than or equal to 19%, more preferentially less than or equal to 15%, expressed as equivalent oxides.

In the belitic sulfoaluminous clinker used according to the present invention, the secondary element is generally present in the following amounts:
from 0 to 5%, preferably from 0.01 to 2%, more preferentially from 0.02 to 1.5%, for example from 0.02 to 1% of sodium expressed as a sodium oxide equivalent,
from 0 to 5%, preferably from 0.1 to 2%, more preferentially from 0.2 to 1.5%, for example from 0.2 to 1% of potassium expressed as potassium oxide equivalent,
from 0 to 7%, preferably from 0 to 5%, more preferentially from 0 to 3% of phosphorus expressed as phosphorus pentoxide equivalent.

Preferably the clinker used according to the invention comprises sodium and potassium as secondary elements.

According to an alternative, the belitic sulfoaluminous clinker used according to present invention may comprise as main phases, in % expressed by mass based on the total mass of clinker:
(i) from 15 to 36% of a belite phase;
(ii) from 37 to 56% of a calcium sulfoaluminate phase; and
(iii) from 1 to 28% of a ferroperovskite phase, comprising calcium, aluminium, silicon, magnesium and iron, and characterized by x-ray diffraction peaks (2-theta) at 33.2°, 47.7° and 59.4° using $CuK_\alpha$, x-rays with a wavelength of 0.15406 nm;
the clinker comprising: from 3 to 15% of iron expressed as $Fe_2O_3$; and from 0.2 to 5% of boron expressed as boric anhydride.

According to another alternative, the belitic sulfoaluminous clinker used according to present invention may comprise as main phases, in % expressed by mass based on the total clinker mass:
(i) from 36 to 53% of a calcium sulfoaluminate phase; and
(ii) from 31 to 50% of a belite phase;
the clinker comprising: less than 3% of iron expressed as $Fe_2O_3$; and from 0.2 to 5% of boron expressed as boric anhydride.

The belitic sulfoaluminous clinker may for example be obtained according to the method described in patent application WO 2006/018569.

The belitic sulfoaluminous clinker may also be produced according to a method which comprises clinkerization, preferably at a temperature from 1,150° C. to 1,400° C., more preferentially from 1,200° C. to 1,325° C. of calcium, silicon, sulfur, alumina, magnesium, iron and boron sources capable by clinkerization of providing the phases as described herein before.

The belitic sulfoaluminous clinker according to the invention may for example be produced in the following way:
a) preparing a crude material comprising a raw material or a mixture of raw materials capable, by clinkerization, of providing the phases as described herein before;
b) mixing the crude material obtained in step a) with at least one additive providing a secondary element as mentioned above, in amounts such that, after clinkerization, the total amount of secondary elements, expressed as indicated herein before, is less than or equal to 19% by mass based on the total mass of belitic sulfoaluminous clinker; and
c) calcining the mixture obtained in step b), for example at a temperature from 1,150° C. to 1,400° C., preferably from 1,200° C. to 1,325° C., for example during at least 15 minutes in a sufficiently oxidizing atmosphere for avoiding reduction of the calcium sulfate into sulfur dioxide.

Preferably, the raw materials which may be suitable for carrying out step a) of the method described herein before may originate from quarries or result from an industrial method and comprise:
a silicon source, for example a sand, a clay, a marl, flying ashes, combustion ashes of coal, a puzzolan or silica fume;
a calcium source, for example a limestone, a marl, flying ashes, combustion ashes of coal, a slag, a puzzolan or residues of calcination of domestic garbage;
an alumina source, for example a clay, a marl, flying ashes, combustion ashes of coal, puzzolan, bauxite, a red alumina sludge (notably an alumina sludge from industrial wastes during extraction of alumina), a laterite, an anorthosite, an albite or a feldspar;
a sulfur source;
a magnesium source;
an iron source, for example an iron oxide, a laterite, a steelwork slag or iron ore; and
a boron source.

The boron source may for example comprise colemanite (di-calcium hexaborate pentahydrate), borax or boric acid, preferably colemanite. The boron source may stem from quarries or result from an industrial process.

The crude material may also comprise a calcium sulfate, for example gypsum, calcium sulfate hemihydrate (α or β) or anhydrous calcium sulfate.

The preparation of the crude material of step a) may be achieved by mixing the raw materials. The raw materials may be mixed in step a) by putting them into contact, optionally comprising a milling and/or homogeneization step. The raw materials of step a) may optionally be dried before step a) or calcined before step a).

The raw materials may be added sequentially, in the main entrance of the oven, and/or in other entrances of the oven. Further, the combustion residues may also be integrated into the oven.

Preferably, the raw materials which may be suitable for carrying out step b) of the method described herein before are:
a boron source, for example borax, boric acid, colemanite or any other compound containing boron: the boron source may stem from quarries or result from an industrial process;
a magnesium source, for example a magnesium salt;
a sodium source, for example a sodium salt;
a potassium source, for example a potassium salt;
a phosphorus source, for example a phosphorus salt;
or mixtures thereof.

The raw materials which may be suitable for carrying out step b) are in solid form (for example as a powder), in semi-solid or liquid form.

Step c) is a clinkerization step, which means in the sense of the invention a baking step. By clinkerization, is meant in the sense of the invention the reaction between the chemical elements of step b) which leads to the formation of the phases of the sulfoaluminous clinker according to the present invention. This step may be carried out in a conventional cement work oven (for example a rotary oven) or in any other type of oven (for example a passage oven).

By sufficiently oxidizing atmosphere, is for example meant atmospheric air, but other sufficiently oxidizing atmospheres may also be suitable.

A hydraulic binder is a material which sets and cures by hydration. A hydraulic binder generally comprises a clinker, calcium sulfate and optionally a mineral addition.

A belitic sulfoaluminous clinker may be milled together with calcium sulfate in order to obtain a cement. The calcium sulfate used includes gypsum (calcium sulfate dihydrate, $CaSO_4.2H_2O$), the semi-hydrate ($CaSO_4.1/2H_2O$), anhydrite (anhydrous calcium sulfate, $CaSO_4$) or one of their mixtures. The gypsum and the anhydrite exist in the natural condition. It is also possible to use calcium sulfate which is a by-product of certain industrial processes.

Preferably, the hydraulic binder according to the invention comprises from 0.1 to 40%, more preferentially from 0.1 to 20%, still more preferentially from 0.1 to 10% of calcium sulfate, a % by mass based on the total mass of hydraulic binder.

Preferably, the hydraulic binder further comprises a mineral addition. These mineral additions are for example slags (for example as defined in the NF EN 197-1 standard of February 2001, paragraph 5.2.2), natural or artificial puzzolans (for example as defined in the NF EN 197-1 standard of February 2001, paragraph 5.2.3), flying ashes (for example as defined in the NF EN 197-1 standard of February 2001, paragraph 5.2.4), calcined shales (for example as defined in the NF EN 197-1 standard of February 2001, paragraph 5.2.5), mineral additions based on calcium carbonate, for example limestone (for example as defined in the NF EN 197-1 standard of February 2001, paragraph 5.2.6), silica fumes (for example as defined in the NF EN 197-1 standard of February 2001, paragraph 5.2.7), metakaolins, biomass ashes (for example rice husk ashes) or mixtures thereof.

Preferably, the mineral addition comprises a puzzolan, a slag, a flying ash or mixtures thereof. The mineral addition may also comprise a mineral addition comprising calcium carbonate, for example limestone.

Preferably, the hydraulic binder comprises from 0.1 to 70%, more preferentially from 0.1 to 50%, still more preferentially from 0.1 to 30% of mineral additions, a % by mass based on the total mass of hydraulic binder.

Preferably, the hydraulic binder comprises by mass from 30 to 99.8% of a clinker according to present invention; from 0.1 to 40% of calcium sulfate; and from 0.1 to 69.9% of mineral additions; the total of the percentages being greater than or equal to 97%.

It is understood that by replacing a portion of the clinker with a mineral addition it is possible to reduce the carbon dioxide emissions (produced during the manufacturing of the clinker) by decreasing the amount of clinker, while obtaining the same mechanical strengths.

The present invention also relates to a method for manufacturing a hydraulic binder according to the present invention, wherein a belitic sulfoaluminous clinker is put into contact with at most 5% of silica having a BET specific surface area under nitrogen of at least 50 $m^2/g$, preferably of at least 60 $m^2/g$, the percentage being expressed by mass based on the mass of the binder. Preferably, the clinker and the silica are mixed or milled together.

The present invention also relates to a hydraulic composition comprising the hydraulic binder according to the present invention and water.

A hydraulic composition generally comprises a hydraulic binder and water, optionally granulates and optionally adjuvants. The hydraulic compositions include both compositions in the fresh condition and in the cured condition, for example a cement slurry, a mortar or a concrete. The hydraulic composition may be directly used on the building site in the fresh condition and cast into a mold adapted to the targeted application, used in a prefabrication plant or used as a coating on a solid support.

The amount of water is preferably such that the effective water/binder mass ratio is from 0.2 to 1.2, more preferentially from 0.3 to 0.8.

The granulates used include sand (for which the particles generally have a maximum size (Dmax) greater than or equal to 4 mm), and gravels (for which the particles generally have a minimum size (Dmin) greater than 4 mm and preferably a Dmax of less than or equal to 20 mm).

The granulates include limestone, siliceous and silicolimestone materials. They include natural, artificial materials, wastes and recycled materials. The granulates may also for example comprise wood.

The hydraulic composition may also comprise an adjuvant for a hydraulic composition, for example an accelerator, an air entrainer, a viscosifying agent, an inertizer of clays, a plasticizer and/or a super-plasticizer.

Inertizers of clays are compounds which give the possibility of reducing or preventing the detrimental effects of clays on the properties of hydraulic binders. The inertizers of clays include those described in WO 2006/032785 and WO 2006/032786.

The term of "super-plasticizer" as used in the present description and the accompanying claims is to be understood as including both reducers of water and super-plasticizers as described in the book entitled "*Concrete Admixtures Handbook, Properties Science and Technology*", V. S. Ramachandran, Noyes Publications, 1984.

The mixing of the hydraulic composition may for example be carried out according to known methods.

The hydraulic composition may be shaped so as to produce, after hydration and curing, a shaped object for the building field. The invention also relates to such a shaped object which comprises a hydraulic binder according to the present invention. The shaped objects for the building field include for example a floor, a screed, a foundation, a wall, a partition, a ceiling, a beam, a working surface, a pillar, a bridge pier, a building block, a duct, a post, a staircase, a panel, a cornice, a mold, a roadway element (for example a pavement edge), a roof tile, a coating (for example for a roadway or a wall) or an insulating (acoustic and/or thermal) element.

The present invention also relates to a use of at most 5% of silica, a mass percentage based on the binder mass, in order to improve compressional strength beyond 1 day, preferably from 7 days onwards, more preferentially from 14 days after the mixing, of a belitic sulfoaluminous clinker, the silica having a BET specific surface area under nitrogen of at least 50 $m^2/g$, preferably at least 60 $m^2/g$.

In the present description, and in the accompanying claims, the percentages are expressed by mass, except when specified otherwise.

The percentages of the phases are determined with known methods, for example by x-ray diffraction by using Rietveld analysis. The quantitative analysis of a clinker is carried out by Rietveld analysis of the spectrum obtained by x-ray diffraction on this clinker. The clinker sample to be analyzed is finely milled in order to form a sample for which all the particles pass through a sieve with 63 µm meshes. The reference x-ray diffraction spectra of the crystalline phases present in the sample to be analyzed (except for the glassy phase which does not have any well-defined spectrum) are obtained from pure samples of these phases. In order to quantify each crystalline phase and the glassy phase, an x-ray diffraction spectrum of a crystalline phase not present in the sample to be analyzed is used as a reference. Suitable reference materials include rutile, quartz and corundum. The percentage of each crystalline phase and of the glassy phase in a clinker sample is then calculated from the x-ray diffraction spectrum of the sample by using the Rietveld analysis, the reference spectra of each pure phase and the spectra of the reference material which is generally rutile. The calculation method described in European patent No. 1 260 812 may be used. As the intensity of an x-ray source in an x-ray diffractometer may decrease over time it is desirable to measure the diffraction spectra of the reference material and of the pure crystalline phases when the spectrum of the sample to be analyzed is measured.

The measurement of the amount of the chemical elements present in the clinker according to the present invention is generally conducted by using X fluorescence spectroscopy. The results are normally expressed in terms of an oxide of each element.

The following, non-restrictive examples illustrate exemplary embodiments of the invention.

EXAMPLES

The BCSAF-1 clinker had the following mineralogical composition, the figures being expressed in mass percentages, unless specified otherwise:

| Ye'elimite | 39.1 |
| Belite α' | 32.5 |
| Belite β | 5.3 |
| Ferrite | 21.4 |
| Ferroperovskite | 1 |
| Anhydrite | 0.7 |

The cement-1 comprised 95.5% of BCSAF-1 clinker and 4.5% of anhydrite, by mass based on the total cement mass.

The BCSAF-2 clinker has the following mineralogical composition, the figures being expressed in mass percentages, unless specified otherwise:

| Ye'elimite | 30.5 |
| Belite β | 53.8 |
| Belite gamma | 1.7 |
| Brownmillerite $Ca_2Al_xFe_{(2-x)}O_5$ | 14.0 |

The cement-2 comprised 94.4% of BCSAF-1 clinker and 5.6% of anhydrite, by mass based on the total cement mass.

The clinker BCSAF-3 has the following mineralogical composition, the figures being expressed in mass percentages, unless specified otherwise:

| Orthorhombic Ye'elimite | 32.2 |
| Belite β | 39.4 |
| Brownmillerite $Ca_2Al_xFe_{(2-x)}O_5$ | 28.4 |

The cement-3 comprised 90% of BCSAF-3 clinker and 10% of anhydrite, by mass based on the total cement mass.

The silica was a precipitated silica having a BET specific surface area according to the ISO 9277 standard, of 55 m²/g, a particle size Dv50 according to the ISO 13320-1 standard, of 18.5 µm and at least 97% of $SiO_2$ according to the ISO 3262-19 standard (CAS no: 112926-00-8; trade name: Sipernat 360; provider: Evonik Industries).

Example 1

The effect of the silica used according to the present invention on the mechanical compressional strength from 1 day after mixing was tested on two hydraulic compositions and was compared with controls not comprising any silica.

The tested hydraulic composition was a mortar comprising 450 g of cement, 1,350 g of sand and 225 g of water.

The sand was standardized sand which was a siliceous sand according to the EN 196-1 standard of April 2006, the provider of which was "Société Nouvelle du Littoral".

Each of the tested mortars had a water/cement mass ratio of 0.5.

The mortar was manufactured according to the procedure described in the EN 196-1 standard of April 2006, with a cement into which silica was added before the kneading.

The measurement of the mechanical compressional strengths was carried out on samples of hardened mortar in the form of a slab with dimensions 40 mm×40 mm×160 mm according to the procedure described in the EN 196-1 standard of April 2006.

Table 1 hereafter shows the tested compositions and the results obtained for mechanical compressional strengths at 20° C. at different deadlines from 1 day after mixing.

TABLE 1

| | Silica | Cement-1 | Cement-2 | Compressional strength (MPa) | |
| | | | | 14 days | 28 days |
| --- | --- | --- | --- | --- | --- |
| Control1 | 0 | 100 | — | 40 | 45 |
| Comp. 1 | 1 | 99 | — | 44 | 50 |
| Comp. 2 | 3 | 97 | — | 43 | 52 |
| Control2 | 0 | — | 100 | 28 | 31 |
| Comp. 3 | 0.5 | — | 99.5 | 28.5 | 32 |
| Comp. 4 | 2 | — | 98 | 32.5 | 37 |
| Comp. 5 | 3 | — | 97 | 34.5 | 40 |

In the preceding table, the values are expressed in mass percentages, unless if specified otherwise.

According to the Table 1 herein before, by comparing the mortars comprising silica as used according to the present invention (Comp.1 to Comp.5) and the controls not comprising any silica (Control1 and Control2), the addition of silica as used according to the present invention improve the mechanical compressional strengths beyond 1 day after the mixing.

Compositions were made with more than 5% by mass of silica, but this amount of silica caused negative secondary effects, for example on the rheology of the compositions.

Example 2

The effect of the silica used according to the present invention on the kinetics for acquiring the mechanical strengths was also able to be illustrated by measuring the amount of strätlingite in the hydraulic composition after mixing. Indeed, strätlingite is the hydrate formed during hydration of the belite phase of the belitic sulfoaluminous clinker.

The tested hydraulic composition was a slurry comprising the cement 3 and water, and having a water/cement mass ratio of 0.5.

The slurry was prepared by manually mixing the cement and the water for 2 minutes.

The slurry was cast into pillboxes with a diameter of 1 cm and a height of 5 cm.

At each deadline of 3, 7 and 14 days, the hardened slurry was manually milled in a mortar in China until a powder was obtained.

The hydration of this powder was stopped by washing with acetone and then with washing with ether. Once dry, the residue was analyzed by x-ray diffraction microscopy and thermogravimetric analysis (=ATG=mass loss versus temperature). The mineralogical phases were quantified by Rietveld analysis. The obtained results have been related to the effective mass of the sample, as this is usually done.

Table 2 hereafter shows the tested compositions and the obtained results for the amount of stratlingite at different deadlines in a mass percentage based on the slurry mass. The Slurry-1 did not comprise any silica used according to the present invention. The Slurry-2 and the Slurry-3 respectively comprise 1% and 2% of silica used according to the present invention by mass based on the cement mass.

TABLE 2

|  | Slurry-1 | Slurry-2 | Slurry-3 |
|---|---|---|---|
| 3 days after mixing | 0 | 0 | 10 |
| 7 days after mixing | 0 | 12 | 28 |
| 14 days after mixing | 5 | 35 | 42 |

According to Table 2 herein before, by comparing the Slurry-2 and Slurry-3 comprising of silica used according to present invention and Slurry-1 not comprising any silica, it was ascertained that addition of silica gave the possibility of forming strätlingite earlier and in a larger amount. The improvement in the hydration kinetics and thus of the kinetics for acquiring the strength, by addition of silica was able to be demonstrated.

The invention claimed is:

1. A hydraulic binder comprising a belitic sulfoaluminous clinker and silica having a BET specific surface area under nitrogen of at least 50 m$^2$/g, the amount of silica being less than 5%, a percentage expressed by mass based on the binder mass.

2. The hydraulic binder according to claim 1, wherein the clinker is a belite-calcium-sulfoaluminate-ferrite (BCSAF) clinker.

3. A hydraulic composition comprising water and a hydraulic binder according to claim 1.

4. A shaped object for the building field comprising a hydraulic binder according to claim 1.

5. The method for manufacturing a hydraulic binder according to claim 1, wherein a belitic sulfoaluminous clinker is put into contact with less than 5% of silica, a mass percentage based on the binder mass.

6. The method according to claim 5, wherein the clinker and the silica are mixed or milled together.

7. A method for improving compressional strength beyond 1 day after mixing of a hydraulic binder comprising a belitic sulfoaluminous clinker, the method comprising mixing less than 5% of silica, a mass percentage based on the binder mass, with a belitic sulfoaluminous clinker, the silica having a BET specific surface area under nitrogen of at least 50 m$^2$/g.

8. A hydraulic composition comprising water and a hydraulic binder according to claim 2.

9. A shaped object for the building field comprising a hydraulic binder according to claim 2.

* * * * *